Feb. 27, 1968 H. MORELLO 3,370,314
TAPE GUIDE AND CLEANER
Filed June 30, 1965
FIG. 1
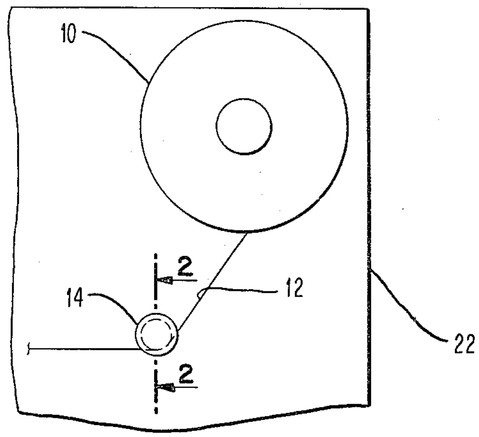
FIG. 2
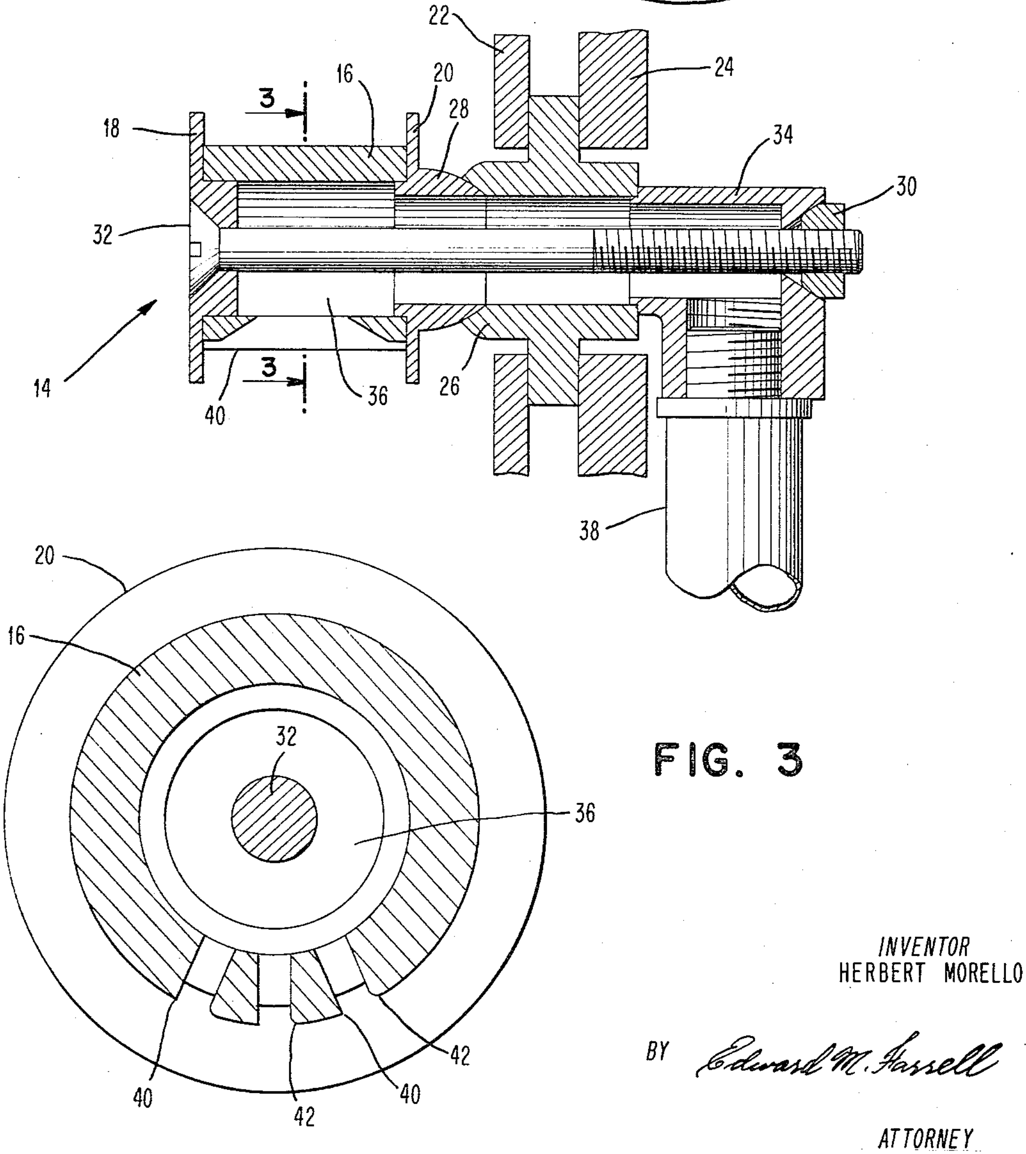
FIG. 2, FIG. 3
INVENTOR
HERBERT MORELLO
BY Edward M. Fassell
ATTORNEY

United States Patent Office 3,370,314
Patented Feb. 27, 1968

3,370,314

TAPE GUIDE AND CLEANER

Herbert Morello, Utica, N.Y., assignor to Sperry Rand Corporation, New York, N.Y., a corporation of Delaware Filed June 30, 1965, Ser. No. 468,416
4 Claims. (Cl. 15—308)

This invention relates to magnetic tape transport systems and, more particularly, to tape guides and cleaners used in such systems.

Tape guides have been used extensively for guiding magnetic tape as it approaches and moves away from a magnetic head unit where reading or writing operations are performed. The magnetic head unit generally comprises multiple aligned head pieces for reading and writing information on a plurality of parallel tracks on the tape. It is important that the alignment of the tape with respect to the head be precisely maintained during operation. Otherwise, misaligned information may cause skewing and other problems in the system.

Aside from the faulty reading and writing of information bits which may result from misalignment between the tape and head, misaligned tape may result in excessive wear of the tape. This wear is especially likely to occur on the edges of the tape if the tape guide bearing surface is not exactly parallel with the flat surface of the tape.

In the past, precisely machined parts of high tolerances have been used in connection with tape guides. This was to assure that the surface of the tape guide would be maintained in position to receive the flat surface of the tape to minimize tape edge wear. While the use of such precision parts have reduced tape edge wear, they have also added considerably to the cost and labor involved in tape transport units.

It is an object of this invention to provide an improved tape guide.

It is still a further object of this invention to provide an improved tape guide which may be precisely adjusted with respect to a tape surface.

It is still a further object of this invention to provide an improved tape guide assembly which minimizes the need for precision parts of high tolerances.

It is still a further object of this invention to provide an improved tape guide including tape cleaning means.

In accordance with the present invention, a tape guide assembly includes a guide element having a cylindrical surface for receiving tape. The guide element is mounted to a wall with its surface substantially perpendicular therewith. Means for adjusting the relative position of the guide element with respect to the wall is provided so that the relative position of the surface of the guide element with respect to the wall may be precisely aligned. Cutting elements are included in the tape guide assembly to clean the tape during operation.

Other objects and advantages of the present invention will be apparent and suggest themselves to those skilled in the art, from a reading of the following specification and claims, in conjunction with the accompanying drawing, in which:

FIGURE 1 illustrates a portion of a tape transport system including a tape guide assembly, in accordance with the present invention;

FIGURE 2 is a cross-sectional view of a tape guide assembly, taken along lines 2—2 of FIGURE 1, and FIGURE 3 is a cross-sectional view of a tape guide assembly, taken along lines 3—3 of FIGURE 2.

Referring particularly to FIGURE 1, a tape reel 10 is adapted to accept or dispense magnetic tape 12. A tape guide 14 guides the tape to or from a magnetic head (not illustrated). The tape guide 14 is designed to maintain the magnetic tape 12 in alignment as well as to perform a cleaning operation on the tape.

Referring particularly to FIGURE 2, the tape guide 14 includes cylindrical element 16 for receiving the flat portion of tape 12. The tape guide includes an outer cap or guide element 18 and an inner cap or guide element 20.

The guide element 14 is secured to support panels 22 and 24. A flange element 26 is secured between the support panels 22 and 24. The inner cap 20 includes a ball joint 28. A second ball joint in the form of a nut 30 is provided to receive a screw 32. The screw 32 extends through the cap element 18, the cylindrical element 16, the inner cap 20, the flange element 26 and a fitting 34. The nut 30 threadedly engages the screw 32 to securely hold all the parts mentioned in place.

A vacuum or pressure chamber 36 is provided within the cylindrical element 16. The pressure chamber is connected to a suitable source of low pressure or vacuum (not shown) through bore openings in the inner cap 20, ball joint 28, the flange element 26 and the fitting 34. The fitting 34 is connected to a hose or conduit 38 which may be connected to a suitable source of pressure or vacuum (not illustrated).

The screw element 32, together with the ball joint elements 28 and 30 permits the cylindrical element to be precisely adjusted with respect to the panel 22. For example, the surface of the cylindrical element 16 may be made substantially perpendicular to the panel 22 during assembly before tightening the screw 32. This adjustment makes it possible to provide precise alignment without requiring precision made parts of high tolerances.

It is seen that when the cylindrical element 16 is precisely aligned that the magnetic tape 14 will ride flatly on the element. This minimizes the likelihood of tape wear, especially towards the edges of the tape.

Referring particularly to FIGURE 3, the cylindrical element 16 includes a plurality of cutting edge portions 40 which are substantially perpendicular to the axis of the cylindrical element 16. A plurality of slightly rounded portions 42 are also provided in the cylindrical element. The portions 40 and 42 together form cut away sectors or grooves on the surface of the cylindrical element. These cut away portions lead from the surface of the tape to the vacuum chamber 36.

If the magnetic tape 12 is being moved toward the left, the edge portions 40 will provide a slight scraping action to clean the tape. If the tape is moving toward the right, as during a rewind operation, the tape will engage the rounded portion 42 and no cleaning will take place. Any particles removed from the tape during the cleaning operation will pass into the chamber 36 and be carried away by suitable low pressure or vacuum means.

The embodiments of the invention in which an exclusive property or privilege is claimed are defined as follows:

1. A tape guide assembly comprising a cylindrical element for receiving tape thereon, a pair of tape edge guide elements disposed on said cylindrical element to maintain said tape in alignment on said cylindrical element during operation, a mounting member, first means including a ball joint device for fixedly securing said cylindrical element and said pair of guide elements to said mounting member, and second means including a ball joint device for adjusting the relative position of said cylindrical element with respect to said mounting member prior to fixedly securing said cylindrical element and said pair of guide elements to said mounting member.

2. A tape guide assembly comprising a panel, a mounting flange element secured to said panel, a cylindrical element for receiving tape thereon, an outer cap disposed to guide one edge of said tape, an inner guide element disposed to guide the other edge of said tape, said inner guide including a portion forming a ball joint, a screw extending through said outer cap, said cylindrical element, and said inner guide element, a nut threadedly engaging said screw to hold said outer cap, said cylindrical element, and said inner guide element securely in place, said nut including a rounded portion to form a ball joint, whereby said outer cap, said cylindrical element and said inner guide element may be angularly adjusted with respect to said panel and subsequently held in a fixed position with respect to said panel by tightening said nut on to said screw.

3. A tape guide assembly comprising a panel, a mounting flange element secured to said panel, said mounting flange being dimensioned to form a portion of a ball joint, a connecting element in engagement with said flange element including a portion for forming a ball joint, a cylindrical element for receiving tape thereon, an outer cap disposed to guide one edge of said tape, an inner guide element disposed to guide the other edge of said tape, said inner guide including a portion forming a ball joint with said flange element, a screw extending through said outer cap, said cylindrical element, said inner guide element and said connecting element, a nut for threadedly engaging said screw to hold said outer cap, said cylindrical element, said inner guide element and said connecting element securely in place, said nut including a rounded portion to form a ball joint with said connecting element whereby said outer cap, said cylindrical element and said inner guide element may be angularly adjusted with respect to said panel and subsequently held in a fixed position with respect to said panel by tightening said nut on to said screw.

4. A tape guide and cleaner assembly comprising a panel, a mounting flange element secured to said panel, said mounting flange being dimensioned to form a portion of a ball joint, a connecting element in engagement with said flange element including a portion for forming a ball joint, a cylindrical element for receiving tape thereon, an outer cap disposed to guide one edge of said tape, an inner guide element disposed to guide the other edge of said tape, said inner guide including a portion forming a ball joint with said flange element, a screw extending through said outer cap, said cylindrical element, said inner guide element and said connecting element, a nut threadedly engaging said screw to hold said outer cap, said cylindrical element, said inner guide element and said connecting element securely in place, said nut including a rounded portion to form a ball joint with said connecting element whereby said outer cap, said cylindrical element and said inner guide element may be angularly adjusted with respect to said panel and subsequently held in a fixed position with respect to said panel by tightening said nut on to said screw, said cylindrical element, said outer cap and said inner guide forming a chamber, said cylindrical member having an opening cut in its exterior surface leading into said chamber to form first and second edge portions, said first edge portion having a pair of substantially perpendicular surfaces, said second edge portion including a curved edge whereby when tape is moved in a first direction a cleaning action is performed on said tape by said pair of perpendicular surfaces and no cleaning action is performed on said tape when said tape is moved in a second direction, a source of relatively low pressure, and means for connecting said source of low pressure to said chamber whereby particles removed from said tape are carried away from said tape.

References Cited

UNITED STATES PATENTS

| | | | |
|---|---|---|---|
| 2,092,185 | 9/1937 | Ross et al. | 226—180 X |
| 3,021,041 | 2/1962 | Maksymiak et al. | 226—199 |
| 3,091,794 | 6/1963 | Pillsbury | 226—97 X |

ALLEN N. KNOWLES, *Primary Examiner.*

M. HENSON WOOD, Jr., *Examiner.*